Patented Aug. 24, 1926.

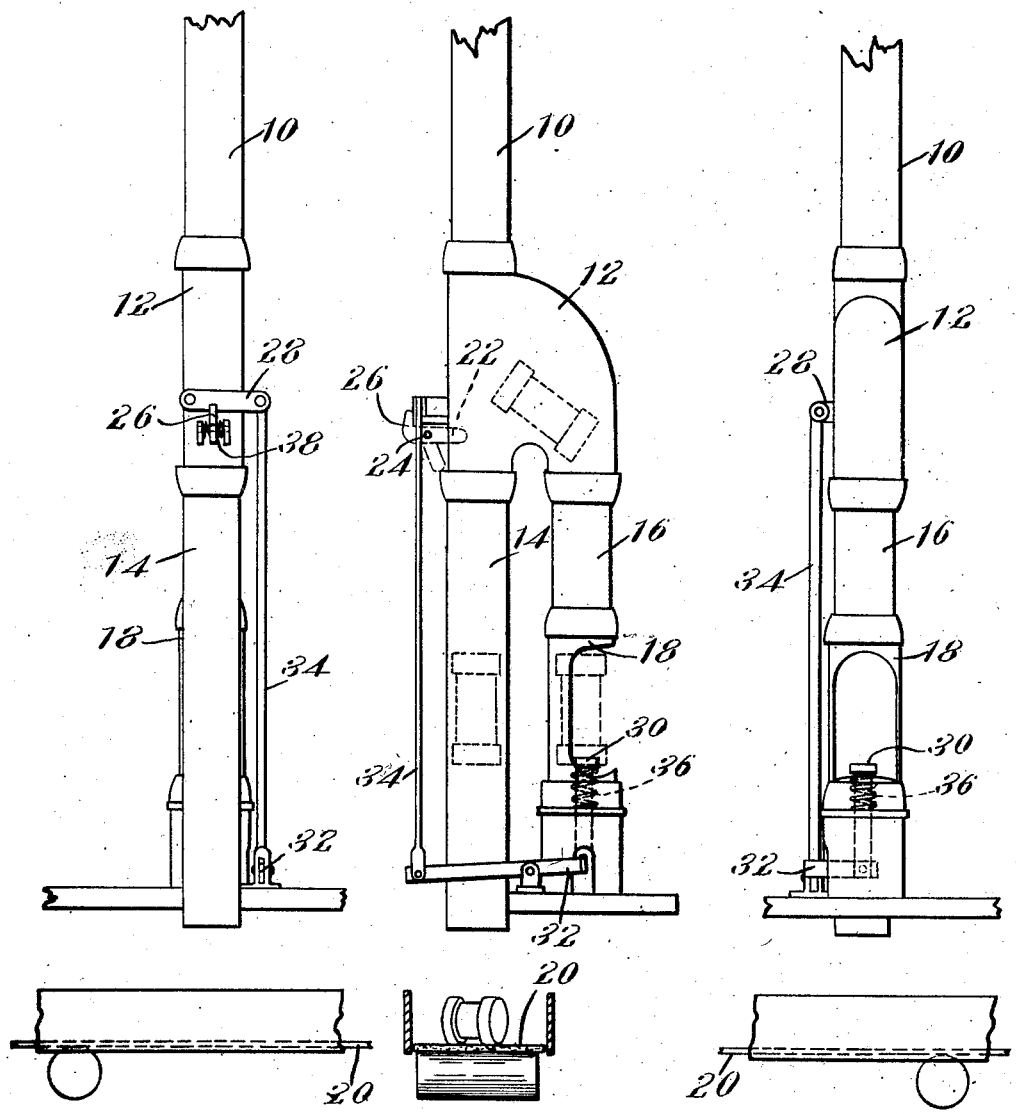

1,597,466

UNITED STATES PATENT OFFICE.

WILLIAM J. HEPPERLE, OF SYRACUSE, NEW YORK, ASSIGNOR TO THE LAMSON COMPANY, OF SYRACUSE, NEW YORK, A CORPORATION OF MASSACHUSETTS.

CARRIER-DISPATCH APPARATUS.

Application filed September 3, 1925. Serial No. 54,225.

The present invention relates to a carrier dispatch apparatus and more particularly to an apparatus for automatically controlling the distribution and reception of carriers.

Carrier dispatch systems are commonly so arranged that carriers, containing money or other articles to be changed or handled, are directed from a definite source or sources to a definite operator, the volume or rate at which the carriers are normally delivered to the receiving operator being limited to the operator's capacity to receive and dispose of them. It sometimes happens, however, that the rate of delivery of carriers increases temporarily above the normal and above that at which they may be conveniently handled without confusion and delay. To avoid the delivery of the carriers at a rate greater than that at which they can be disposed of by a single operator a second or reserve operator is provided to whom the overflow or excess of carriers may be deflected.

An object of the present invention is to provide a carrier receiving device for carrier dispatch apparatus in which the overflow carriers are automatically passed to a reserve operator whenever they are received at a greater rate than that at which they can be handled by the normal operator.

Another object of the invention is to provide a carrier receiving device for carrier dispatch apparatus which, when occupied by a carrier, will automatically pass succeeding carriers to a second or reserve operator.

A still further object in the invention is to provide a receiving device for carrier dispatch apparatus in which the carriers are passed directly to a reserve operator and which automatically discharges carriers to a carrier receptacle whenever the carrier receptacle is empty.

With these and other objects in view the invention comprises the apparatus described in the following specification and defined in the claims.

In the accompanying drawings a preferred embodiment of the invention has been illustrated by way of example as applied to a pneumatic dispatch system. In the drawings:—

Fig. 1 is a front elevation of the discharge end of a pneumatic dispatch apparatus and a carrier receptacle and automatic deflecting means embodying a preferred form of the invention;

Fig. 2 is a side elevation of the apparatus shown in Fig. 1; and

Fig. 3 is a rear view of the apparatus shown in Figs. 1 and 2.

In the present invention the carriers which arrive through an incoming delivery terminal are intercepted and deflected to a carrier receptacle by means of a trip device or deflector, which is locked in position when the carrier receptacle is empty, but which is automatically released, permitting the carriers to pass to the reserve operator, when the receptacle is occupied by a carrier. To this end the incoming tube terminal is extended past the carrier receptacle for a short distance, forming a passage leading to the reserve operator and is connected by means of a branch tube to the carrier receptacle. As the carriers are delivered through the incoming tube they are intercepted by means of the trip or deflector, which is normally locked in position when the carrier receptacle is empty, and fall through the branch tube to the empty receptacle. As soon as the receptacle is occupied the trip is released by mechanism actuated by the weight of the carrier deposited in the receptacle, and succeeding carriers are permitted to pass to the reserve operator. After each passage of a carrier past the trip, the trip is returned to normal position and is locked as soon as the deposited carrier is removed from the receptacle.

Referring more particularly to the accompanying drawings, the carriers to be received and handled are delivered through a downwardly extending incoming tube terminal 10 and enter a branch or Y connection 12, which connects the incoming tube 10 with an overflow tube 14 for excess carriers and with a short tube 16 leading to a carrier receptacle 18. The overflow tube 14 is in alignment or approximate alignment with the incoming tube 10 so that the incoming carriers tend to pass directly through the overflow tube 14 to a reserve operator stationed at its terminus, or to a conveying means such as the belt conveyor 20 leading from one or more of such overflow tubes to a reserve operator. In the normal operation of the apparatus the carriers are intercepted in the branch or Y connection 12 by a trip or deflector 22, which is pivoted at 24 in a bracket mounted on the rear wall of the branch 12 and extends forwardly into the lower part of the branch 12.

A carrier, engaging the deflector, falls through the branch tube 16 into the receptacle 18.

The lever 22 extends outwardly through the rear wall of the branch 12 and is normally rigidly held from turning in a clockwise direction as viewed in Fig. 2 by means of a latch 28 which engages an upwardly extending arm 26 of the trip or deflector. When carriers are discharged through the tube 10 at a rate above the normal or when for any reason a carrier remains in the carrier receptacle 18, the latch 28 is raised by lever mechanism actuated by the weight of the deposited carrier, and succeeding carriers are enabled to depress the lever 22 and pass straight through the overflow tube 14.

To this end, a pin 30 is mounted in the bottom of the carrier receptacle 18 in position to be depressed by the weight of a carrier and to operate the mechanism for lifting the latch 28. The pin 30 extends downwardly through the bottom of the receptacle and is connected at its lower end to a lever 32, the other end of which is connected to the latch 28 by means of a connecting rod 34. The pin 30 is normally held in its upper position by means of a spring 36, positioned between the head of the pin 30 and the base of the carrier receptacle and which also tends to hold the lever 32 and latch 28 in position to engage the arm 26 of the trip 22. When the pin 30 is depressed, the lever 32 is tilted, lifting the connecting rod 34 and the latch 28 and releasing the trip 22.

The trip 22 is yieldingly held in its normal position across the path of carriers in the branch 12 by means of a spring 38, the strength of which is not sufficient to prevent the trip from being depressed by the weight of a downwardly passing carrier. Accordingly, as long as a carrier remains in the receptacle 18 the succeeding carriers discharged through the tube 10 depress the trip 22 against the pressure of the spring 38 and pass to the overflow tube 14 and belt conveyor 20. The trip 22 is returned to its normal position by means of the spring 38 immediately after the passage of each carrier and, as soon as the deposited carrier is removed from the receptacle 18, the pin 30 is lifted by means of the spring 36 and the latch 28 is returned to its intercepting position in relation to the trip arm 28. The trip 22 is thereby held in its normal position until the pin 30 is again depressed by the deposit of another carrier in the carrier receptacle.

In the above invention only one carrier is delivered to and retained in the receiving receptacle at a time. Each carrier is held in the receptacle in position to be readily removed by the operator in such a manner as to insure a prompt and orderly handling and disposing of the carriers. It is understood that the mechanism by which the latch and trip are operated may be modified and that the trips may be released independently if desired and various other changes in the form of embodiment of the invention may be made to adapt it to different conditions without departing from the broader features of the invention set forth in the following claims.

I claim:

1. In a dispatch apparatus the combination of a carrier delivery terminal, a carrier receiver opening into the delivery terminal, a device within the delivery terminal opposite said opening and normally operatively positioned to engage carriers arriving through said delivery terminal and thereby to cause them to enter the receiver, and means for holding said device in operative position, said holding means becoming inoperative when a carrier is in the receiver.

2. In a dispatch apparatus the combination of a carrier delivery terminal, a carrier receiver, a deflector normally operatively positioned to engage a carrier arriving through said terminal and to deflect said carrier from its normal path to cause it to enter the receiver, means locking said deflector in operative position while the receiver is empty, and means engageable by a carrier entering the receiver for unlocking the deflector.

3. In a carrier dispatch apparatus the combination of a delivery terminal, a carrier receiver, a movable deflector normally operatively positioned to intercept carriers from said terminal and to direct them into the receiver, a latch normally locking the deflector in operative position, and means automatically releasing said latch when a carrier enters the receiver.

4. In a pneumatic dispatch apparatus the combination of an incoming tube, a carrier receptacle out of the path of travel of carriers from said incoming tube, a trip normally positioned to direct carriers from said incoming tube to said receptacle, and means for releasing said trip when said receptacle is occupied.

5. In a pneumatic dispatch apparatus the combination of an incoming tube, a carrier receptacle, a movable deflector normally positioned to intercept carriers from said incoming tube and to direct them into said receptacle, a latch normally holding said trip rigidly in position, and means for releasing said latch when said receptacle is occupied by a carrier.

6. In a pneumatic dispatch apparatus the combination of an incoming tube, a receptacle for receiving carriers from said tube, a trip normally positioned to intercept carriers from said incoming tube and permit them to pass to said receptacle, and a lever mechanism arranged to be operated by the weight of a carrier in said receptacle to release said trip.

7. In a carrier dispatch apparatus the combination of a delivery terminal, a receptacle for receiving carriers from said terminal, a trip for directing carriers to said receptacle, a latch normally holding said trip rigidly in operative position, and a lever mechanism arranged to be operated by the weight of a carrier in said receptacle to release said latch.

8. In a carrier dispatch apparatus, the combination of a delivery terminal, a receptacle for receiving carriers from said terminal, a trip normally positioned to direct carriers from said incoming tube to said receptacle, a latch for holding said trip in rigid position, means for releasing said latch when said receptacle is occupied by a carrier, and a spring for returning said trip to intercepting position, said spring permitting said trip to be depressed by the weight of a carrier.

9. In a pneumatic dispatch apparatus the combination of an incoming tube, a receptacle adapted to receive and hold a carrier in upright position, a trip normally intercepting carriers delivered by said incoming tube to cause them to enter said receptacle, a pin arranged in said receptacle in position to be depressed by a carrier in said receptacle, and a means actuable by said pin to allow the trip to move to an inoperative position.

10. In a pneumatic dispatch apparatus, the combination of an incoming tube, a discharge tube branching from said incoming tube and leading to a receptacle for the reception of carriers, a trip normally positioned to intercept carriers from said incoming tube and to deflect them to said carrier receptacle, and means for automatically releasing said trip when said receptacle is occupied to permit carriers arriving through said incoming tube to continue their course without deflection.

11. In a pneumatic dispatch apparatus the combination of an incoming tube, a discharge tube branching from said incoming tube and leading to a carrier receptacle from which carriers may be removed, a device adjacent to the delivery end of said incoming tube normally positioned to direct carriers from the said incoming tube to said carrier receptacle, a pin in the lower part of the carrier receptacle adapted to be depressed by a carrier resting in said receptacle, and means actuable by said pin to allow the trip to move to an inoperative position.

12. In a pneumatic dispatch apparatus the combination of an incoming tube having a side branch leading to a carrier receptacle, means normally positioned to direct carriers from said incoming tube to said carrier receptacle, and means actuated by a carrier in said receptacle for releasing said means to permit it to become inoperative.

13. In a pneumatic dispatch apparatus the combination of an incoming tube, a carrier receptacle, a branch tube leading from said incoming tube to said carrier receptacle, a trip extending into said incoming tube in the lower part of said branching portion, a spring arranged to hold said trip in position in said tube and to permit it to be depressed by a passing carrier, a catch holding said trip in position in said tube and means actuated by a carrier in said receptacle for releasing said catch.

Signed by me at Syracuse New York this thirty-first day of August 1925.

WILLIAM J. HEPPERLE.